(12) United States Patent
Gray et al.

(10) Patent No.: US 7,522,710 B2
(45) Date of Patent: Apr. 21, 2009

(54) PERSONALIZABLE AND CUSTOMIZABLE FEATURE EXECUTION FOR IP TELEPHONY USING OPERATIONAL SEMANTICS AND DEONTIC TASK TREES

(75) Inventors: Thomas A. Gray, Carp (CA); Daniel Amyot, Hull (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 695 days.

(21) Appl. No.: 10/631,853

(22) Filed: Aug. 1, 2003

(65) Prior Publication Data

US 2004/0028077 A1 Feb. 12, 2004

(30) Foreign Application Priority Data

Aug. 12, 2002 (GB) ............................. 0218710.2

(51) Int. Cl.
*G06F 17/00* (2006.01)
(52) U.S. Cl. .................. 379/49; 706/55; 706/57
(58) Field of Classification Search .......... 706/49, 706/55, 57
See application file for complete search history.

(56) References Cited

U.S. PATENT DOCUMENTS 5,638,494 A 6/1997 Pinard et al.

FOREIGN PATENT DOCUMENTS

| EP | 0 932 099 A2 | 7/1999 |
|---|---|---|
| GB | 2 351 870 | 1/2001 |
| GB | 2 353 612 | 2/2001 |
| GB | 2 353 612 A | 2/2001 |
| GB | 2353612 A | 2/2001 |
| GB | 2 355 140 A | 4/2001 |
| GB | 2 375 264 A | 11/2002 |
| WO | WO 94/27411 | 11/1994 |

OTHER PUBLICATIONS

Raymond J. A. Buhr, Daniel Amyot, Mohamed Elammari, Darcy Quesnel, Tom Gray, Serge Mankovski: Feature-Interaction Visualisation and Resolution in an Agent Environment. FIW 1998: 135-149.*

Rui Gustavo Crespo, Luigi Logrippo, Tom Gray: Feature Execution Trees and Interactions. PDPTA 2002: 1230-1236.*

Mihai Barbuceanu, Tom Gray, Serge Mankovski: Coordinating with Obligations. Agents 1998: 62-69.*

(Continued)

*Primary Examiner*—David R Vincent
*Assistant Examiner*—Lut Wong (57) ABSTRACT

A communication system for implementing personalizable and customizable features, comprising a tuple space, and a plurality of user agents representing the features, the user agents communicating with each other via assertions posted to the tuple space in order to implement the features while avoiding feature interactions, each of the features being structured as a set of deontic task trees having a parent node with an obliged inherent action and a plurality of child nodes with respective node actions performed according to a predetermined sequence, the results of which are reported back to the parent node, the parent node placing deontic modalities on the behavior of the child nodes such that successful implementation of the feature results from successful occurrence of the inherent action and composed success of the node actions of the children nodes.

6 Claims, 3 Drawing Sheets

OTHER PUBLICATIONS

Rui Crespo, Luigi Logrippo, Tom Gray, "Feature Execution Trees and Interactions" The 2002 International Conference on Parallel Distributed Processing Techniques and Applications, Jun. 2002, Las Vegas NV, pp. 1230-1236.*

M. Barbuceanu; S. Mankovskii, T. Gray ; Coordinating with Obligations ; Sep. 30, 1997 ; pp. 1-19.

European Search Report; EP 03 01 7609; completed Oct. 31, 2003.

Subhayya Abu-Hakima; Innes Ferguson; Nancy Stonelake; Ed Bijman; Richard Deadman; A Help Desk Application for Sharing Resources Across Across High Speed Networks Using a Multi-Agent Network Architecture, published at a workshop (Workshop on AI in Distributed Information Networks) at the IJCAI conference (International Joint Conference on Artificial Intelligence) in Montreal in 1995.

Tom Gray; Eliana Perez; Debbie Pinard; Suhayya Abu-Hakima; Aurora Diaz, Innes Ferguson; A Multi-Agent Architecture for Enterprise Applications;Submitted to 13th International Distributed Artificial Intelligence Workshop in 1994, published on the Internet in 1994.

Michael Weiss; Tom Gray; An Agent-Based Multimedia Service Environment, published in 1995.

D. Pinard; T. Gray; Serge Mankovski; Michael Weiss; Issues In Using an Agent Framework For Converged Voice and Data Applications, published at the PAAM (Practical Application of Agents and Multiagents) in London in 1997.

Mihai Barbuceanu; Tom Gray; Serge Mankovski; How To Make Your Agents Fulfil Their Obligations, published at the PAAM (Practical Applications of Agents and Multiagents) in Minneapolis in 1998.

Crespo, Rui Gustavo; Logrippo, Luigi, Gray, Tom: "Feature Execution Trees and Interactions" PDPTA 2002: 1230-1236.

Sinnreich, H.; Johnston, A.B. "Internet Communication Using SIP", Wiley, 2001 pp. 104-108.

Schulzrinne, H.: Rosenberg, J. "SIP Caller Preferences and Callee Capabilities", Columbia U./Bell Laboratories, Feb. 26, 1999.

Lennox, J.; Schulzrinne, H. "Call Processing Language Framework and Requirements", IETF RFC2824.

Chisel in Griffeth, N. et al. "Feature Interaction Detection Contest", Appendix C. Feature Definitions, Feature Interactions in Telecommunications and Software Systems V, Kimbler, K.; Bourna, L.G., editors; IOS Press 1998.

Barbuceanu, M., Gray, T., Mankovski, S. "Role of Obligations in Multiagent Coordination", Applied Artificial Intelligence, 13: 11-38, 1999.

Barbuceanu, M. "Agents That Work in Harmony by Knowing and Fulfilling Their Obligations", American Association for Artificial Intelligence, 1998.

Gray, T., Liscano, R., Wellman, B., Quan-Haase, A., Radhakrishnan, T., Choi, Y. "Context and Intent in Call Processing", Feature Interactions in Telecommunications and Software Systems VII, IOS Press, 2003.

* cited by examiner

PERSONALIZABLE AND CUSTOMIZABLE FEATURE EXECUTION FOR IP TELEPHONY USING OPERATIONAL SEMANTICS AND DEONTIC TASK TREES

FIELD OF THE INVENTION

This invention relates generally to Internet Protocol (IP) telephony, and more particularly to a method and apparatus for implementing personalizable and customizable features using operational semantics and deontic task trees.

BACKGROUND OF THE INVENTION

One important characteristic of emerging IP telephony systems is the ability to personalize features to the needs of individuals and to customize systems to the specific requirements of an enterprise. Instead of a prior art monolithic public network that provides standard services to mass consumer bases, IP telephony is based on the inter working of large numbers of independent networks. Each of these networks may have its own definition of features.

Within an enterprise, emerging IP telephony systems will enable each user to specify call handling features that are tailored to the user's specific needs. Consequently, such systems will be heavily customized and personalized in the field to meet customer requirements. The ability to compose new features in addition to existing features gives rise to a need in the art to resolve feature interactions at run-time.

Traditional models of call processing fall into two distinct categories. The older model utilizes centralized call processing in which a call is created as a single entity in a single place. In such prior art systems, 'busy' means that a telephone set has gone off-hook and therefore the telephone switch control cannot communicate with it.

In the newer Intelligent Network (IN) SS7 (signaling system 7) model, the call results from the cooperation of two distinct entities (call-halves) which cooperate by means of message passing and negotiation over a digital backbone using ISUP protocol. Feature logic is centralized in offices referred to as SCPs (service control points). Features operating in the local offices (SSPs or service signaling points) may have trigger points in their code for referring operation to an SCP to obtain proper behavior.

The distributed call-halve model allows for call processing to be physically distributed. With call state sharing, the prior art assumptions regarding 'busy' status have been modified giving rise to features such as 'call waiting' and 'camp on'. A call process that is separate from the equipment used to make call connection has allowed for communication with the user on an existing call, and user notification of a call queue awaiting his/her attention. Consequently, system designers have been provided with additional opportunities to create useful user features by the expanded capability of such systems to communicate with the user device.

The foregoing prior art call-processing models share the characteristic of a centralized definition of features. Indeed, in the instantiation of the Intelligent Network (IN), this was considered to be a primary benefit of the distributed model (i.e. new features can be defined and provisioned centrally in the IN). This ensures a quick time to market for new features and stability in the network as features need to be designed only once to run on switching systems purchased from any manufacturer. Network stability is further assured since features are designed by teams of experienced designers with a view to avoiding 'bugs' resulting form interactions of multiple feature designs.

The advantages set forth above of centralized feature definitions and execution are offset by difficulties in carrying sufficient user context information to the central feature execution location. Most useful features are specific to and have knowledge of the current user context. IN services therefore have great difficulty with customized and personalized services. As a result, the IN and its successor the Advanced Intelligent Network (AIN) have not been able to achieve what had been hoped for by their original proponents.

The Internet has created an emphasis on a new set of non-functional requirements that have been difficult to achieve using the above-described existing models of call processing. Centralized feature definitions make it difficult to create customized services tailored to particular enterprises in the public network and to create services personalized to the needs of specific users in enterprise networks, which are hallmarks of Internet applications.

For example, the SIP and CPL protocols have been developed by IETF to provide user defined call handling (see Sinnreich, H; Johnston, A. B., *Internet Communication Using SIP*, Wiley, 2001 pp 104-108, and The Internet Draft by Schulzrinne, H.; Rosenberg, J.; SIP Caller Preferences and Callee Capabilities, Feb. 26, 1999 copyright The Internet Society. In these models, call disposition is not controlled by a centralized set of standard features designed in a lab environment by expert developers. Rather, the user specifies a set of personal features that can be tailored to closely match the needs of the user's activities within an enterprise environment. These personal features can be cognizant of the identity of the user's collaborators, the nature of the work being done, the user's calendar and so on.

Within SIP, a user may register several Contact addresses with the proxy server that is serving him/her. The user may specify in the SIP INVITE message the types of connections he/she will accept. More particularly, the user specifies the characteristics of the end point (or User Agent) in the ACCEPT-CONTACT and REJECT-CONTACT headers that the user prefers to either accept or reject, respectively. These headers can specify specific end-points in terms of their URLs as being preferred for acceptance or rejection.

The ability to identify specific end points that are preferred for rejection or acceptance provides a new level of features that are being enabled by SIP. The caller preferences in SIP may specify characteristics of the physical device at the end point, which provides an easily understood application of this protocol to conventional telephony.

However, there is no adequate explanation in the SIP drafts of how conflicts between called party and caller preferences may be identified and resolved. The CPL specification [Lennox, J.; Schulzrinne, H.; Call Processing Language Framework and Requirements, IETF RFC2824, May 2000 copyright the Internet Society mentions that certain caller preferences may be ignored in making a decision. However no guidance is given as to whether such a capability is acceptable or even useful. In short the currently specified SIP call handling procedures are inadequate for call handling in realistic call processing situations.

Prior art methods of specifying features have been entirely prescriptive (see, for example, the description of Chisel in Griffeth, N et al; *Feature Interaction Detection Contest Appendix C. Feature Definitions*, Feature Interactions in Telecommunications and Software Systems V; Kimbler, K., Bouma, L. G., editors; IOS Press 1998). In such a prior art system flexible feature operations are specified but there is no indication as to how feature interactions are resolved. In particular, Chisel does not specify the feature operations that can be safely omitted if failure will not defeat the main goal of the overall feature. This causes difficulty in the run-time resolution of features. A system cannot know that it can safely avoid performing some operation if that operation is in violation of the intent of another feature or some other enterprise constraint.

Thus, the prior art does not provide an effective architecture for handling user preferences in the execution of features and especially in the handling of conflicts between preferences. Consequently, doubts have been expressed concerning the scalability and evolvability of such protocols to realistically sized systems using Internet technology.

One prior art application of deontic methods to the problem of telephony features in relationship to OPI (Obligation, Permission, Interdiction) systems, is set forth in Barbuceanu. M., Mankovskii, S., Gray, T.; *Coordinating with Obligations*; Proceedings of the 2nd International Conference on Autonomous Agents (Agents'98).

There are several handicaps in the approach of Barbuceanu et al that must be remedied for practical use. For example, the use of truth maintenance for the propagation of received constraints in OPI is a very complex and time-consuming task. It is impractical to use truth maintenance for the run-time resolution of feature conflicts. Chief among the difficulties in using OPI is the fact that a truth maintenance system, on receiving a new constraint, is capable of identifying as forbidden actions that have already taken place. How such a system would react to 'un-ring a bell', for example, or to withdrawing an alerting signal sent to a user in run-time resolution, is not clear. Indeed, a close reading of the prior art publication of Barbuceanu et al shows that OPI is intended for pre-planning of features and not for run-time operation.

Since OPI is intended for the pre-planning or off-line definition of features, it has no need to specify observers of real world states. It does not have to address the problem of responding to changes in the environment.

The original OPI structure has difficulty with the composition of features (i.e. the task of adding a new feature to an already existing set). The original OPI assumes consistency of a given set of features based on the values of the deontic modalities that govern each node. What this means is that the tree stands on its own and does not communicate with any other set of features. It does not have a way of coordinating its behavior with other sets of features. There is no insight in the published OPI concepts about where a new or additional feature should be added to an existing tree.

The original OPI, as discussed above, is not concerned with run-time operation. It is primarily a planning tool. For run-time operation, the trees must be able to respond to events (assertions and state changes in the world) so as to adapt feature behavior. A feature therefore must have the ability to recognize that the intent of what it is trying to do may not be possible and in response gracefully modify its behavior.

SUMMARY OF THE INVENTION

The present invention builds on concepts from the original work of Barbuceanu et al on OPI. Specifically, the use of deontic modalities and the concept of trees are used to define relationships between telephony features (according to the present invention trees are considered to be a specification of feature execution). However, according to the present invention new elements are added and new semantics are set forth that completely change the basis of the prior art OPI concept. As a result, the prior art OPI has been modified from a planning system for a monolithic predefined feature set to a set of semantics that are optimized for run-time execution of dynamically composed features that adapt to external events.

The original OPI was an abstract planning specification that had no connection to the environment in which a system operates. The execution interpretation according to the present invention supplies additional capability so that a feature can make assertions that will either directly control hardware in the environment or act as communication elements with other features. Similarly, the invention provides the ability to monitor the environment for assertions from other features.

The original OPI was concerned only with describing the operations that made up a feature. A new type of node has been added according to the present invention that monitors the system environment for changes in states of the world of assertions. The addition of modalities to these observers provides a unique benefit for feature interaction detection (i.e. at design or specification-time) and resolution (i.e. at run-time).

As part of execution, each node monitors the success of its own operation. The deontic modalities give the system the ability to determine essential and optional operations in a feature specification. During execution this allows the system to negotiate feature behavior with the ability to determine if a particular feature has met its prime objective. This capacity is not present in existing feature specification systems such as Chisel, which lessens their ability to specify features taking into account required interactions. Tree node monitoring also greatly eases the design of systems for run time interaction detection and resolution by providing a feasible way of performing negotiations.

Modalities are applied to each node. Some nodes specify interaction with other features (i.e. how the feature is to react to the actions of other features). If an action requested from another node is given the modality "obliged" and it cannot be performed, then the current feature is deemed to have failed and clean up measures are invoked. Similarly, if an interdicted observation occurs the feature is considered to have failed and clean up measures take place.

However, the "permitted" modality has surprising and unexpected results. Many previous specification techniques suffer from the difficulty of creating large numbers of spurious feature interactions that are required to be detected by standard techniques. This greatly limits the benefits of these techniques since the designer is often plagued with large numbers of false interactions that may mask detection of significant undesired interactions. The "permitted" modality of the present invention indicates nodes whose success or failure does not affect the overall success of the feature. These are nodes that create optional behavior that may be desirable but are not necessary for stable operation and user goal success. This "permitted" modality property of the present invention eliminates much of the spurious interactions that have plagued previous techniques, thereby making feature interaction detection much more beneficial to real-world designers.

These aforenoted properties of the modalities operate at run time and indicate how a feature should respond to the actions of cooperating features. This makes feature interaction resolution at run time much easier than is possible with the prior art. Again, the "permitted" modality is of importance as it allows features to continue operation despite the failure of other features or despite the effect of enterprise constraints, if the failed or forbidden action is not essential to the overall goal of the feature.

The ability of the inventive system to specify features with deontic modalities provides the designer and the system with the ability to specify and determine the state of success of a feature. Thus, a feature can determine if a proposed constraint on feature operation can be safely accepted or not.

Generally, according to the present invention a system is provided for the run-time resolution of features. This is very necessary in IP telephony since the parties have independent feature definitions and are usually connected only for the duration of a call. There is no opportunity for pre-planning of feature interactions between unrelated parties. As discussed above, OPI in its original description is inadequate for this task.

The system of the present invention therefore relates to the run-time execution of features as well as their specification, and so requires the ability to detect and respond to real world events. Therefore, the system provides observers.

According to the present invention, a new functionality is provided in which trees specifying and executing features communicate with each other by the use of assertions to the environment and the ability to monitor the environment for assertions and changes in the world. Features may be composed at run-time by this communication since features can inform others potential features of intended actions and wait for advice or permission before proceedings.

The assertion method used in the present invention is set forth in commonly assigned UK Patent Application No. 9920051.1, (U.S. Pat. No. 7,096,259 corresponds thereto) and entitled Call Processing with Synchronized Tuple Spaces. Use of this assertion method allows for features to be specified in the abstract, by identifying the assertions in call processing that are of interest to their operation. This also allows a feature to coordinate its operation with existing features at run-time by the issuance and monitoring of assertions. The present invention provides a mechanism to specify and regulate the coordination identified in Applicant's copending UK Application No. 9920051.1.

The present invention is particularly helpful for making the needed coordination understandable to humans. It has been the experience of the inventors that software designers of normal skill cannot visualize the necessary cooperation between the single pre-condition type policies described in Application No. 9920051.1 (U.S. Pat. No. 7,096,259 corresponds thereto). The trees of the present invention provide users with a mechanism of describing detailed connections among policies.

BRIEF DESCRIPTION OF THE DRAWINGS

A detailed description of the invention is set forth herein below, with reference to the following drawings, in which.

DETAILED DESCRIPTION OF THE PREFERRED EMBODIMENT

There are some basic concepts that are necessary for an understanding of the principles of operation of the inventive system. These include the concepts of nodes and trees, node action, operators and nodes' inherent actions, and deontic modalities.

The operations of features in the system of the present invention are described herein by the behavior of nodes that are arranged in a tree structure. The trees are executed depth first from left to right. Each node performs an action or makes an observation and reports the occurrence or non-occurrence of the action or observation to its parent (obviously excluding the top node). The operation of the child nodes is initiated by their parent in terms of a set of operators that define this sequencing.

As indicated above, nodes are the elements that perform actions and make observations in the system of the present invention. These operations are referred to collectively herein by the term 'node action.' There are four basic actions that a node can perform. These are:

ASK—nodes coordinate their activity with that of other trees. In effect, a feature tree can modulate its actions from advice given by other agents. With this operator, the node places an assertion in a tuple space that indicates its intention to perform some action (i.e. asking for permission). For permission, the node may wait a period of time for replies from any other feature that decides to advise on this intention. An internal policy is then used to decide whether or not to continue depending on the advice. This is set forth and described in copending UK Application No. 992005.1 (U.S. Pat. No. 7,096,259 corresponds thereto), but expands upon it.

STATE—a node places an assertion in the tuple space that is a notification of its intent, such as to trigger a relevant feature, etc. This is an atomic action that carries on immediately without waiting for interactions from other features.

ACT—a node places an assertion in the tuple space that performs an action in the physical environment (e.g. make a connection, apply ringing, etc.)

OBSERVE—a node places an assertion in the space to monitor events that indicate either states of the physical world or requests from other agents for its actions. The node looks for such physical world states as 'user off hook', 'user available', etc. It is used to look for messages of other nodes such as the intention to perform some action, the precondition for its own behavior, etc.

Each node may have an inherent action or observation and child nodes that can perform actions of their own. The node is supplied with an operator that indicates how the actions of its children should be organized. The operators are:

PARALLEL—the child nodes are triggered at the same time. The node waits for a response from each child node.

SEQUENCE—the child nodes are triggered one at a time left to right. As the name implies, a sequence of actions and/or observations is defined by this behavior.

FORK—the child nodes are triggered at the same time. The node waits for the first response only. All other responses will be ignored.

CHOICE—the nodes are triggered left to right. The node waits for the first response that indicates an occurrence or non-occurrence that can be interpreted as success, as described in detail below.

SELECT—with this operator each child node becomes associated with a predicate based on the value of a fact in an assertion in the tuple space. The predicates are evaluated left to right. The child that contains the first predicate deemed true is triggered. Only one child is triggered by the operator. If no child is triggered the node assumes a non-occurrence from the child nodes.

It is envisaged that operators other than the above may be created (e.g. an operator that is similar to CHOICE in which all node with true predicates are triggered). Thus, the above list should be considered non-exhaustive.

As described above, each node has its own inherent action. This action is performed before the actions of the child nodes are triggered with the appropriate operator.

Deontic modalities are described below. However it is assumed that each inherent action has the deontic modality of O (obliged).

The occurrence or non-occurrence of the action defined by a node is a composition of the success of the inherent action and the composed success of the occurrence or non-occurrence of the child nodes, as described below. Both the node's own action and the actions of its children must be interpreted as successful for the node's action to be said to have occurred. Otherwise, it is interpreted as a non-occurrence.

Deontic logic is the logic of obligation; it may be used, for example, to define the dependencies that define the responsibilities for actions within a bureaucracy. By reasoning with it one can determine if the polices within an organization are consistent or inconsistent if one is obliged both to do and not do something, or if situations are not covered by any policy.

There are four modalities, as shown in Table 1, but all can be derived from the basic obligations. Thus, O(P) means that the proposition is obligated. The disclosure of the present invention uses only the O, P and I modalities.

TABLE 1

Explanation of Deontic Modalities

| | | |
|---|---|---|
| Obligation O(T) | O(T) | Obliged to do T do T |
| Permission P(T) | ~O(~T) | Not Obliged Not to do T so T may be done or not as one pleases |
| Interdiction I(T) | O(~T) | Obliged Not to do T do not do T |
| Waiver W(T) | ~O(T) | Not Obliged to do T so a previous obligation is removed |

As described earlier in this disclosure, features are defined in terms of the operation of a set of nodes that are arranged in a tree structure. All nodes except the top node in a structure have a parent. The parent places deontic modalities on the behavior of each of its children. Each child node reports the occurrence or non-occurrence of the action or observation given to it. The occurrence or non-occurrence is interpreted as success or failure for the parent node according to Table 2.

TABLE 2

| | Occurrence | Non-Occurrence |
|---|---|---|
| Obliged | Success | Failure |
| Permitted | Success | Success |
| Interdicted | Failure | Success |

This table indicates that the occurrence or non-occurrence of a permitted node has no effect on the interpretation of success by the parent node. The permitted modality identifies nodes whose actions or observations are not essential for the success or failure of the overall feature. They may be eliminated at will to prevent action that may violate a constraint of another feature.

As indicated previously, a node has its own inherent action or observation as well as deontic modalities for the occurrence or non-occurrence of the actions or observations of its child nodes. The node combines the occurrence of its own action with that of the composed success of its children (see Table 3).

TABLE 3

Composed Success of Child Nodes

| Operator | Composed Success |
|---|---|
| Parallel | All child actions or observations must occur |
| Sequence | All child actions or observations must occur |
| Choice | One child's action or observation must occur |
| Fork | One child's action or observation must occur |
| Select | The selected child's actions must occur |

The composed success of the children is an interpretation of the occurrence or non-occurrence of their action or observation and the operator that sequences their action.

To reiterate, a node's inherent action is considered to be in sequence with the actions of its children. Thus, the occurrence or non-occurrence of a node's actions or observations is composed under the sequence operator from the success of the node's inherent action (always considered obliged) and the composed success of its children. Thus, both the node's inherent action or observation and that of the node's children must succeed for the node's overall action or observation to be considered to occur. Otherwise it is considered not to have occurred.

The following is an XML DTD that describes a language for specifying a feature specification system based on the system according to the present invention:

```
<!ELEMENT system (user)+, >
<!ATTLIST system
    tuple_space CDATA #REQUIRED>
<!ELEMENT user feature_set_>
<!ATTLIST user
    name NMTOKEN #REQUIRED
    size_session_pool CDATA #REQUIRED >
<!ELEMENT feature_set (tree)+>
<!ELEMENT tree (node, (tree)*)>
<!ATTLIST tree
    num_local_assertion CDATA #IMPLIED
    precondition CDATA #IMPLIED>
<!ELEMENT node ((on_success)?,(on_failure)?,(on_timeout)?>
<!ATTLIST node
    name NMTOKEN #REQUIRED
    operator (parallel |sequence |choice |fork |select) #IMPLIED
    action (ask |state |act |observe) #IMPLIED
    action_parameter CDATA #IMPLIED
    local_write_assertion CDATA #IMPLIED
    local_read_assertion CDATA #IMPLIED
    modality (O | P | I) #REQUIRED
    selection CDATA #IMPLIED
    selection_value CDATA #IMPLIED
    on_timeout (occurrence |nonoccurrence) #IMPLIED
    timeout CDATA #IMPLIED>
<!ELEMENT on_success (assertion)*>
<!ELEMENT on_failure (assertion)*>
<!ELEMENT on_timeout (assertion)*>
<!ELEMENT assertion (scope, fact, (task, (modulator)*)?>
<!ATTLIST assertion
    type (local |shared) #REQUIRED
    to CDATA #IMPLIED>
<!ELEMENT scope EMPTY>
<!ATTLIST scope CDATA #REQUIRED>
<!ELEMENT fact EMPTY>
<!ATTLIST fact CDATA #REQUIRED>
<!ELEMENT task EMPTY>
<!ATTLIST task
    task CDATA #REQUIRED>
```

-continued

```
<!ELEMENT modulator EMPTY
<49 ATTLIST modulator
    modulator CDATA #REQUIRED
```

Figure 1:
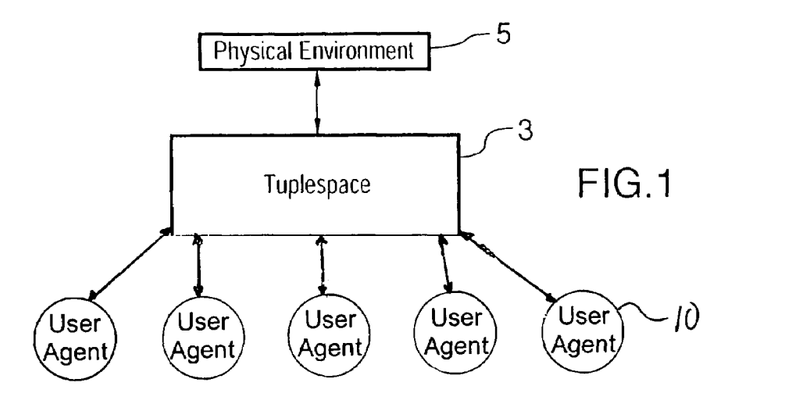
FIG. 1 is a block diagram of a system for providing communication among a plurality of agents according to the present invention.

A basic outline of the system according to the present invention is shown in FIG. 1. It consists of a number of user agents 10 that communicate by assertions that are exchanged via the tuple space 3. Each of these agents is responsible for the features for an individual of a group within the population served by the system. It is through the programming of these agents that the customization and personalization of features for each particular user and group is achieved. The agents 10 communicate with each other through the assertions, and are able to observe events and control operations in the real world 5 through assertions posted to the tuple space 3.

Before discussing the use of the tuple space 3 in detail, a brief introduction is provided below of the basic structure and operation of a tuple space.

A tuple is a set of type/value ordered pairs called ingles. Each ingle consists of a type (e.g. Name) and a value (e.g. John Doe). Thus, a tuple which describes an employee for a company could, for example, be:

{ :name John Doe :age 37 :employee_number 12345 :start_date 810126 :position T12 }

The tuple space enables coordination by allowing queries based on the matching of tuples by anti-tuples. An anti-tuple is a tuple that can be used as a query in the tuple space. In form, it is identical to a tuple except that the value of any or all fields may be replaced by a '?' which indicates a 'don't care' condition. Tuple spaces are set up to match tuples with anti-tuples which agree in all fields except for that one indicated by the ? query. Thus the anti tuple:

{ :name ? :age 37 :employee_number ? :start_date ? :position T12 } would return the tuples for all employees of position T12 who are 37 years old.

Conventional operations on the tuple space consist of:

Poke—place a tuple in the tuple space. Duration may be specified for how long this tuple should remain in the space. This may be any period up to indefinite.

Peek—query the tuple space with an anti-tuple. This query may be specified to last for any period up to indefinite. Copies of matching tuples will be returned through the interface and the tuples remain in the tuple space.

Pick—query the tuple space with an anti-tuple. This query may be specified to last for any period up to indefinite. Copies of matching tuples will be returned through the interface and the tuples are removed from the tuple space.

Cancel—with the specified anti-tuple, remove all matching anti-tuples from the tuple space. Tuples themselves may be removed directly by an appropriate pick request.

Thus, the tuple space 3 is used in the system of the present invention as a facilitator for communication and thus cooperation among features. Features communicate by way of assertions that are stored in the tuple space. Features can subscribe to assertions whose content is indicative of actions of interest to a call in progress.

Referring to the XML DTD set forth above, each user I is provided with a unique name, which stored in the name element of a tuple. As discussed above, a set of personalized features, together with the enterprise constraints that concern him/her, are defined in terms of a set of deontic task trees. The set of user features is stored in the feature set element of a tuple to operate a subscribe/publish mechanism with the tuple space 3. For efficient implementation, there are several sets of subscriptions and publications set up in the tuple space 3, which can be assigned to incoming calls as needed. These form a pool of feature logic handlers that provide services to each incoming call.

As discussed above, a tree is a hierarchical structure that contains the individual nodes that perform the actions and make the observations necessary for a feature. The tree element as defined in the DTD above (i.e. <!ELEMENT tree (node, (tree)*)>), contains the recursive definition of this structure of nodes.

Each tree incorporates local storage to handle assertions that are of interest to itself only. The number of these local assertions is defined in the num_local_assertion attribute.

Each tree also has a precondition that triggers its activity. This precondition is stored in the precondition attribute.

The node is the element that contains the structure for actions and observations necessary for feature operation.

Table 4 contains explanations of the use of the node attributes:

TABLE 4

Node Attribute Explanation

| Attribute | Explanation |
|---|---|
| name | Unique name for node in tree |
| operator | Contains the name of the operator that should be used to sequence the activity of child nodes |
| action | Defines the type of action or observation that a node is to take |
| action_parameter | Contains the parameter which describes the details of the action that the node is to take |
| on_timeout | Contains the value of occurrence or non-occurrence that the node is to transmit if a timeout occurs |
| timeout | Contains the value of the timeout period |
| write_assertion | Contains the identity of the local assertion that an action or observation is to write to |
| read_assertion | Contains the identity of the local assertion that an action or observation is to read from |

The format of an assertion is SCOPE FACT TASK MODULATOR.

Thus, from the DTD above, it will be noted that every assertion must have a SCOPE and a FACT. Optionally, the assertion may include a TASK, and with optional TASK may also have one or more MODULATORS. The following are assertions to the tuple space 3, as used in the system of the present invention:

Scope

Scope, as used in this disclosure, means the name for an assertion that can be used for subscription by a node. It is assumed in the following description that scope is of the feature set.

Fact

This is a fact about the user, the environment etc.

Task

A task is a description of a goal that the sender requires a receiver to perform. It is in the form of a Modality and has a goal, as in O(Originate).

Modulator

Given a task, optional modulators may be placed in the assertion. This is a constraint that the sender places on the execution of the goal that it has sent. They are of the form I(Redirect), Some examples of assertions are:

Scope Precondition Perform O (Originate) I(Redirect)

Scope 1742 O(Redirect)
Scope True

There is also a set of well-known assertions that are significant to operation of the system, user and session scale, and are useful to all nodes. These include:
  Originator Busy
  Originator ON Hook
  System Overload.

Figure 2:
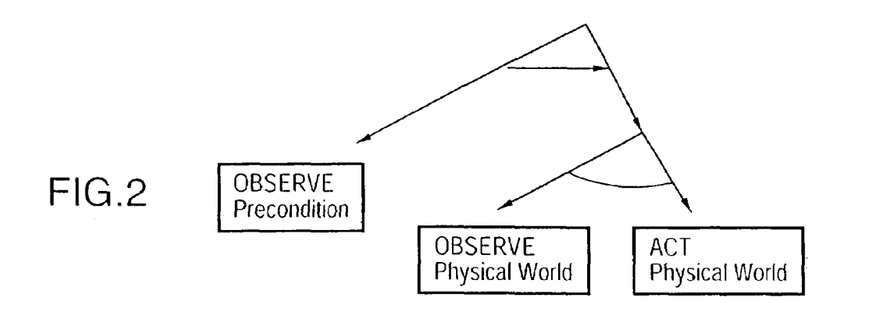
FIG. 2 is a tree diagram depicted so as to be understood by human beings.

FIG. 2 illustrates the diagramming convention used herein to describe to the present invention, and which allows a tree to be more easily understood. The nodes are represented by the rectangle boxes that contain explanations of their actions. The nodes are linked by arrows between children and parent with the parent being at the top.

The operator for the child nodes is indicated by the element that links the arrows directed from the parent to the child nodes. In this example, the arrow meaning SEQUENCE and the arc meaning PARALLEL are used for illustration. Symbols for all operators are discussed below with reference to FIG. 3.

It will be noted that the sequence operator is at the top node. This is an illustration of the implicit sequence described above. The node's own action is performed first in sequence with the activity of the child nodes. Since all nodes have this sequence including explicit educators of the implicit sequence in every diagram, to avoid a cluttered and confused appearance, a convention is used herein that a node's inherent action is indicated in box beside it with only the links to the child nodes being shown.

Figure 3:
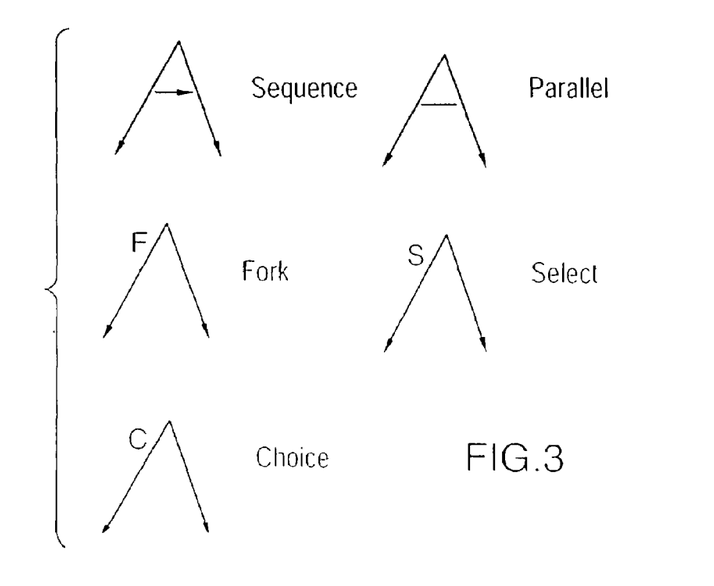
FIG. 3 depicts the indicators that are used for each of the operators in the system according to the present invention.

FIG. 3 shows the indicators used for each of the operators.

Figure 4:
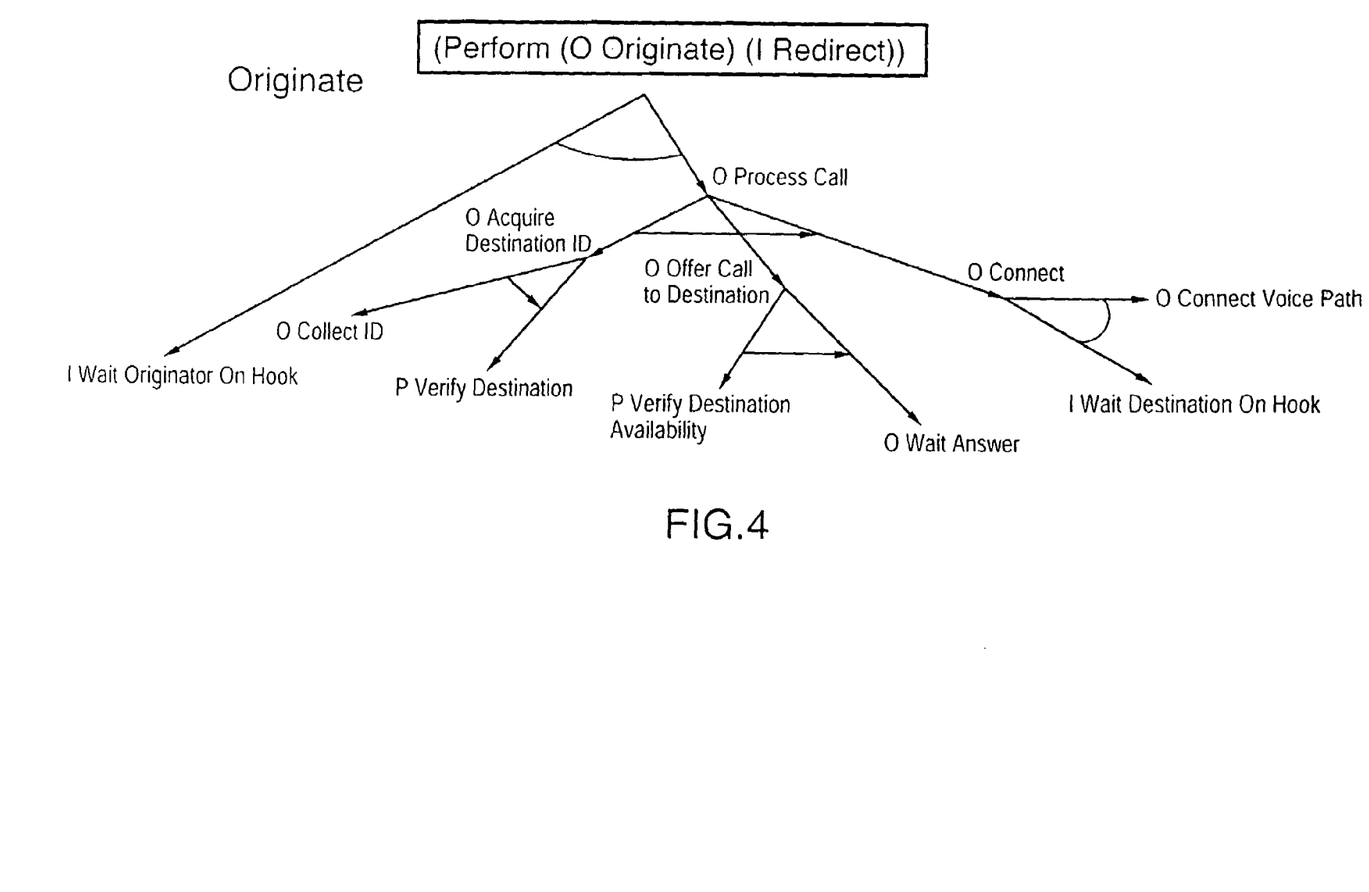
FIG. 4 is a diagram of an exemplary feature tree useful for providing an explanation of tree operation.

FIG. 4 is an illustration of a typical feature used to provide an explanation of tree operation. The tree is illustrated with nodes given with their names, operators and modalities. As discussed above, the node's inherent action has been suppressed for clarity.

As discussed above, a tree's precondition is in reality the inherent action of the top node, which is performed in sequence with the rest of the tree. By convention, the precondition is shown in a box above the top node.

When any and all trees are instantiated within a feature set of a user agent 1, they all subscribe to the tuple space 3 for an assertion in the form of their precondition. In this sense, all trees are active at any one time with the majority of them waiting for their preconditions.

With the precondition satisfied, a tree starts operating depth-first left to right. Thus, with reference to FIG. 4, in response to a user going off hook, some other tree in the network asserts the tuple (Perform O (Originate) (I Redirect). For ease of understanding, the SCOPE value is not shown, since it is an opaque value used in all trees and assertions to differentiate among assertions generated from multiple calls that are sharing the tuple space 3. The precondition Perform (O Originate) (I Redirect) having been satisfied, the tree starts operating depth first with the left node, Wait Originator On Hook, which has an action of observe. It subscribes to the well-known assertion for the calling agent On Hook to become true. Because this node has a modality of I for Interdicted modality, the absence of an On Hook condition is deemed to be a success. This represents a "guard" condition for the tree in that failure of the On Hook occurrence (i.e. success for this I modality node) must be maintained throughout the entire operation of the tree.

Operation of the tree next goes down through a series of nodes to the left-most in the remaining sequence, which is named Collect ID. This node uses a standard technique to obtain the identity of the called party from the user 1. As indicated in FIG. 4, this can be by the collection of digits. It will be noted that this node has the modality of O for obliged. Thus, if for any reason the digits cannot be collected, the non-occurrence is reported to the parent, which interprets this as a failure. The parent then issues its on_failure assertion to notify other features of this failure and commence the clean up pg side effects, etc. The non-occurrence is reported upwards and interpreted as failure. Finally, this reaches the top node, which thereby knows that the feature has failed and issues any necessary assertions to cope with this.

The next node in the sequence, Verify Destination, has modality P for permitted. The node issues an observe subscription for details of the called party. However, in the case of non-occurrence the parent node still finds the node's action successful. This is a very important aspect of this invention.

The modalities provide indications of how interactions with other features should be considered. If another feature cannot perform an "obliged" action then the current feature fails. If it has issued an "interdicted" assertion for an observer the current feature fails. However, with "permitted", a feature can be specified with all operations but with indications as to which ones are not important to the overall operation of the feature. This greatly eases specification and detection of undesirable interactions at design time, by indicating which nodes can be eliminated from this consideration. It is well known in the art that a large problem of prior art feature interaction detection techniques at run-time is the detection of large numbers of spurious interactions. These are not real interactions but are interpreted as such by the limitations of the specification system to identify them.

The present invention addresses this shortcoming and provides the same benefit at run-time where a running feature can ignore trivial and spurious interactions that are of no concern to the overall success of the feature.

It will be noted that, in the feature, there are two observers issued for the on hook state—one for the originator and one for the destination. It will be noted as well that once issued, these continue to run until the respective agent goes on hook. Since both of these are interdicted, their occurrence will cause the call to fail by propagating their non-occurrence upwardly through the deontic tree. This shows another benefit of the semantics provided by the present invention. The trees are not just procedural sequences of operations, but are indications of how independent nodes should sequence their operation. Nodes once triggered can operate independently. Observers can be issued which can govern the behavior of a call and make sure that their basis for operation has not been violated. The real purpose of the feature in FIG. 4 is to set up and maintain a path between originator and destination. If either party goes on hook, the feature fails (i.e. it is no longer required) and cleans up its side effects. The observers operate to effect this functionality. Thus, the Wait Originator On Hook node not only supervises the call after set up but during set up as well. Even during set up, if the originator goes on hook to abandon the call, the observer detects this and causes the feature to fail, thereby triggering any necessary clean up.

Figure 5:
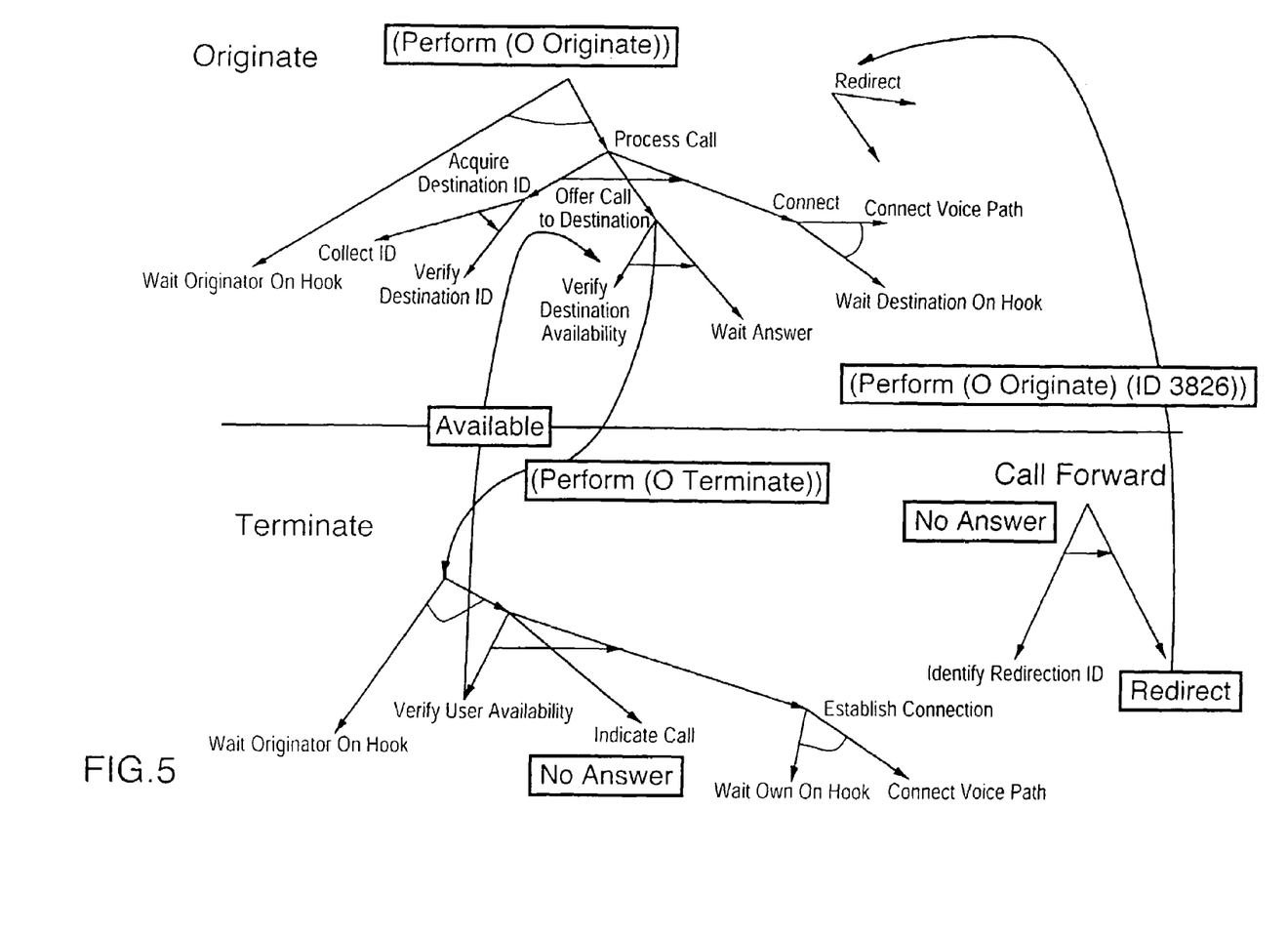
FIG. 5 is tree diagram showing feature cooperation both between user agents and within them, according to an example implementation of the present invention.

FIG. 5 illustrates feature cooperation both between user agents and within them. The diagram is self-explanatory. It shows how features cooperate by exchanging assertions. In particular, it shows how a failed feature may trigger other behavior to meet user needs. In the Terminate feature, the Indicate Call feature waits until the terminator goes off hook. If this does not occur and the node times out, it issues the No Answer Assertion which triggers the Call Forward Node as that assertion is its precondition. This demonstrates how the standard Call Forward No Answer Feature can intervene to maintain the goal of contacting the destination even if the standard Terminate feature cannot succeed.

The feature executions of FIGS. 4 and 5 are illustrative examples of the inventive system and method for implementing personalizable and customizable features using operational semantics and deontic task trees. Modifications and variations to the invention are possible. All such modifications and variations are believed to be within the sphere and scope of the present invention as defined by the claims appended hereto.

The invention claimed is:

1. A communication system for implementing personalizable and customizable features using operational semantics and deontic task tree comprising:
a tuple space;
a plurality of user agents representing said features;
wherein said user agents communicating with each other via assertions posted to said tuple space in order to implement said features,
wherein said assertions to said tuple space include:
Scope, to name said assertions for subscription by a node;
Fact, to convey information about a user,
Task, to define a goal that a sender action requires a receiver action to perform; and
Modulator, to place a constraint on the execution of the goal that a sender action has sent;
wherein each of said features being structured as a set of deontic task trees having a parent node with an obliged inherent action and a plurality of child nodes with respective node actions performed according to a predetermined sequence for implementation of each feature, each agent monitors the success of its own operation and the results of which are reported back to said parent node,
wherein said node actions include an OBSERVE action for placing an assertion in said tuple space to monitor events indicating one of either states within said communication system or requests from other agents for its actions,
said parent node placing deontic modalities on the behavior of said child nodes such that successful implementation of each feature at run-time results from successful occurrence of said inherent action and composed success of the node actions of said children nodes, and
wherein said deontic modalities include Obligated, meaning the associated action must occur in order to be successful Interdicted, meaning the associated action must not occur to be successful and Permitted, where by the associated action of the child node need not occur for successful implementation of the feature in spite of trivial and spurious interactions.

2. A communication system as claimed in claim 1, wherein said parent node is provided with a sequence operator defining said predetermined sequence.

3. A communication system as claimed in claim 1, wherein said node actions include an ASK action for placing an assertion in said tuple space seeking permission to perform an intended action, waiting a period of time for replies from any other features that subscribe to said assertion, and thereafter either continuing with or discontinuing said intended action based on an internal policy based on said replies.

4. A communication system as claimed in claim 1, wherein said node actions include an atomic STATE action for placing an assertion in said tuple space notifying all subscribing features of an intention to perform an intended action, and thereafter continuing with said intended action.

5. A communication system as claimed in claim 1, wherein said node actions include an ACT action for placing an assertion in said tuple space that performs an action in said communication system.

6. A communication system as claimed in claim 2, wherein said sequence operator is selected from the group consisting of:
PARALLEL—wherein all child nodes are triggered simultaneously and said parent node waits for a response from each child node before reporting one of either successful implementation or failure of said feature;
SEQUENCE—wherein said child nodes are triggered in sequence from left to right and said parent node waits for a response from each child node before reporting one of either successful implementation or failure of said feature;
FORK—wherein said child nodes are triggered simultaneously and said parent node waits for a first response from one of said child nodes before reporting one of either successful implementation or failure of said feature;
CHOICE—wherein said child nodes are triggered in sequence from left to right and said parent node waits for a first response from one of said child nodes before reporting one of either successful implementation or failure of said feature; and
SELECT—wherein each child node becomes associated with a predicate based on the value of a fact in an assertion in said tuple space and only the child node that contains the first predicate deemed true is triggered, and in the event that no child is triggered the parent node assumes a non-occurrence from the child nodes.

* * * * *